(12) United States Patent
Riddle et al.

(10) Patent No.: US 10,323,161 B2
(45) Date of Patent: Jun. 18, 2019

(54) AQUEOUS COMPOSITIONS FOR COATING METALLIC SURFACES, METHODS, AND ARTICLES

(71) Applicant: 3M INNOVATIVE PROPERTIES COMPANY, St. Paul, MN (US)

(72) Inventors: Justin A. Riddle, St. Paul, MN (US); Adam J. Meuler, Woodbury, MN (US); DanLi Wang, North Oaks, MN (US); Zachary J. Malmberg, Roseville, MN (US); Syud M. Ahmed, Minneapolis, MN (US); Paul B. Armstrong, St. Paul, MN (US); Milind B. Sabade, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 19 days.

(21) Appl. No.: 15/511,023

(22) PCT Filed: Sep. 11, 2015

(86) PCT No.: PCT/US2015/049610
§ 371 (c)(1),
(2) Date: Mar. 14, 2017

(87) PCT Pub. No.: WO2016/044082
PCT Pub. Date: Mar. 24, 2016

(65) Prior Publication Data
US 2017/0275495 A1 Sep. 28, 2017

Related U.S. Application Data

(60) Provisional application No. 62/052,303, filed on Sep. 18, 2014.

(51) Int. Cl.
| | | |
|---|---|---|
| *B05D 7/14* | (2006.01) |
| *C09D 183/08* | (2006.01) |
| *C08G 77/28* | (2006.01) |
| *C08G 77/30* | (2006.01) |
| *C08L 83/06* | (2006.01) |
| *C08L 83/08* | (2006.01) |
| *C08G 77/26* | (2006.01) |

(52) U.S. Cl.
CPC .......... *C09D 183/08* (2013.01); *C08G 77/28* (2013.01); *C08G 77/30* (2013.01); *C08L 83/06* (2013.01); *C08L 83/08* (2013.01); *C08G 77/26* (2013.01); *C08L 2666/44* (2013.01)

(58) Field of Classification Search
CPC ....... B08B 3/10; C11D 3/162; B05D 2202/00; C09D 183/00
USPC .......................... 510/180; 427/327; 428/450
See application file for complete search history.

(56) References Cited

U.S. PATENT DOCUMENTS

| | | | |
|---|---|---|---|
| 4,013,475 A | 3/1977 | Liebowitz | |
| 4,152,165 A | 5/1979 | Langager | |
| 4,338,377 A | 7/1982 | Beck | |
| 4,830,773 A | 5/1989 | Olson | |
| 5,705,583 A | 1/1998 | Bowers | |
| 5,936,703 A | 8/1999 | Miyazaki | |
| 6,156,108 A | 12/2000 | Wachowiak, Jr. | |
| 6,225,431 B1 | 5/2001 | Bowers | |
| 6,916,773 B2 | 7/2005 | Griese | |
| 6,972,277 B2 | 12/2005 | Dietz | |
| 6,994,890 B2 | 2/2006 | Ohlhausen | |
| 8,088,724 B2 | 1/2012 | Iverson | |
| 8,354,368 B2 | 1/2013 | Schunicht | |
| 8,772,215 B2 | 7/2014 | Ryther | |
| 2007/0116968 A1 | 5/2007 | Dierdorf | |
| 2007/0299177 A1 | 12/2007 | Serobian | |
| 2010/0317559 A1 | 12/2010 | Ryther | |
| 2012/0273000 A1 | 11/2012 | Jing | |
| 2012/0295829 A1 | 11/2012 | Peitersen | |
| 2013/0023458 A1 | 1/2013 | Hodge | |
| 2013/0164730 A1 | 6/2013 | Gustafson | |
| 2013/0256583 A1 | 10/2013 | Schlenoff | |
| 2014/0060583 A1* | 3/2014 | Riddle ..................... | C11D 3/08 134/18 |
| 2015/0166935 A1* | 6/2015 | Gardner, Jr. ............. | C11D 1/92 510/219 |

FOREIGN PATENT DOCUMENTS

| | | |
|---|---|---|
| WO | WO 2007/114808 A1 | 10/2007 |
| WO | WO 2007-146680 | 12/2007 |
| WO | WO 2009-119690 | 10/2009 |
| WO | WO 2010-060006 | 5/2010 |
| WO | WO 2010/025324 A1 | 7/2010 |
| WO | WO 2010-114698 | 10/2010 |
| WO | WO 2011-084661 | 7/2011 |
| WO | WO 2011-163175 | 12/2011 |
| WO | WO 2013-102099 | 7/2013 |
| WO | WO 2014-036448 | 3/2014 |
| WO | WO 2015-143163 | 9/2015 |

(Continued)

OTHER PUBLICATIONS

Cumpson, "The Thickogram: A Method for Easy Film Thickness Measurement in XPS," *Surf. Interface Anal.* 2000, 29, 403-406.

(Continued)

*Primary Examiner* — Gregory E Webb
(74) *Attorney, Agent, or Firm* — Daniel J. Iden

(57) ABSTRACT

The present disclosure is directed to compositions and methods for coating, particularly protecting and optionally cleaning, metallic surfaces, and articles containing such surfaces.

17 Claims, No Drawings

(56) References Cited

FOREIGN PATENT DOCUMENTS

| WO | WO 2015-143262 | 9/2015 |
| WO | WO 2015/164468 A1 | 10/2015 |
| WO | WO 2016-028499 | 2/2016 |

OTHER PUBLICATIONS

IUPAC Gold Book, "Zwitterionic Compounds/Zwitterions", [retrieved from the Internet on May 14, 2017], URL <http://goldbook.iupac.org/Z06752.html>, 3 pages.
Kirk-Othmer, Encyclopaedia of Chemical Technology, John Wiley and Sons, New York, 1979, Third Edition, vol. 8, pp. 900-912.
Litt, "Siloxane Switterions: Synthesis and Surface Properties of Crosslinked Polymers," Journal of Applied Polymer Science, 1975, vol. 15, pp. 1221-1225.
Pujari, "Covalent Surface Modification of Oxide Surfaces", Angewandte Chemie International Edition, Jun. 2014, vol. 53, No. 25, pp. 6322-6356.
Qiu, "Development and Evaluation of New Zwitterionic Hydrophilic Interaction Liquid Chromatography Stationary Phases Based on 3-P, P diphenylphosphonium-propylsulfonate," Journal of Chromatography A, 2011 vol. 1218, pp. 8075-8082.
International Search Report for PCT International Application No. PCT/US2015/049610, dated Nov. 11, 2015, 4 pages.

\* cited by examiner

AQUEOUS COMPOSITIONS FOR COATING METALLIC SURFACES, METHODS, AND ARTICLES

CROSS REFERENCE TO RELATED APPLICATIONS

This application is a national stage filing under 35 U.S.C. 371 of PCT/US2015/049610, filed Sep. 11, 2015, which claims the benefit of U.S. Application No. 62/052,303, filed Sep. 18, 2014, the disclosure of which is incorporated by reference in its/their entirety herein.

BACKGROUND

Stainless steel is ubiquitous in commercial kitchens, home kitchens, office buildings, airports, and various other public spaces. The majority of cleaning products designed for use on stainless steel surfaces are both cleaners and polishers (including mixtures of mineral oil and water, or solvent and mineral oil). The oil in these products helps hide fingerprints by blending/covering them with the applied mineral oil. The oily layer provides the substrate a shiny appearance.

Stainless steel products that utilize this clean and polish approach typically suffer from many drawbacks, including: streaking (e.g., it is difficult to get a streak-free shine); difficult to "spot clean" a portion of the surface (e.g., users typically have to clean an entire area to maintain a uniform oil layer); the product dries slowly, and the appearance changes during drying; attraction to dirt (e.g., oiled surfaces collect lint and dust easily); oil build-up (e.g., mineral oil left on surfaces can accumulate and is difficult to remove); and the inability to cut tough stains commonly found in restrooms.

Thus, there is a need for compositions that can coat, and more particularly protect, and optionally clean and protect, stainless steel surfaces, and other metallic surfaces.

SUMMARY

The present disclosure addresses this challenge. The present disclosure is directed to compositions and methods for coating, and more particularly protecting, and optionally cleaning and protecting, metallic surfaces, and also to articles containing the resultant coated metallic surfaces.

Advantageously, in certain embodiments, compositions of the present disclosure protect metallic surfaces, thereby making them easier to subsequently clean. In certain embodiments, compositions of the present disclosure clean and protect metallic surface (in one step). The compositions include a silicate, a non-zwitterionic anionic silane, and optionally a zwitterionic silane.

In one embodiment, the present disclosure provides an aqueous coating composition that includes: a zwitterionic silane; greater than 0 wt-% and up to 50 wt-% of a silicate; a non-zwitterionic anionic silane; and water; wherein the weight percent silicate is based on the total weight of silicate(s) plus silane(s) solids in the composition, whether the composition is a ready-to-use composition or a concentrated composition.

In one embodiment, the present disclosure provides a method of protecting a metallic surface, the method including: providing a coating composition, optionally, diluting the coating composition, if concentrated, to a ready-to-use composition; applying the ready-to-use composition to a metallic surface; and allowing the ready-to-use composition to dry on the metallic surface. The coating composition includes: greater than 0 wt-% and up to 50 wt-% of a silicate; a non-zwitterionic anionic silane; and water; wherein the weight percent silicate is based on the total weight of silicate(s) plus silane(s) solids in the composition, whether the composition is a ready-to-use composition or a concentrated composition.

In one embodiment, the present disclosure provides a method of cleaning and protecting a metallic surface having contaminants thereon, the method including: providing a coating composition; optionally, diluting the coating composition, if concentrated, to a ready-to-use composition; applying the ready-to-use composition to a metallic surface under conditions effective to remove contaminants from the metallic surface (e.g., such conditions include wiping, scrubbing, etc.); and allowing the ready-to-use composition to dry on the metallic surface. The coating composition includes: greater than 0 wt-% and up to 50 wt-% of a silicate; a non-zwitterionic anionic silane; a surfactant; and water; wherein the weight percent silicate is based on the total weight of silicate(s) plus silane(s) solids in the composition, whether the composition is a ready-to-use composition or a concentrated composition.

The present disclosure also provides articles that include a metallic surface.

In one embodiment, an article includes a metallic surface having a coating composition of the present disclosure disposed thereon.

In one embodiment, an article includes a metallic surface having a coating disposed thereon, wherein the coating is applied by a method of the present disclosure.

In one embodiment, the present disclosure provides an article having a metallic surface that includes a hardened coating, wherein the hardened coating is hydrophilic and includes: a silicate; and a non-zwitterionic anionic silane; wherein the hardened coating is attached to the surface associatively.

DEFINITIONS

A coating composition of the present disclosure may be in a "ready-to-use" form or a "concentrated" form. Herein, a "ready-to-use" composition is one that is not diluted before coating or cleaning a surface. In contrast, a "concentrated" composition is one that is diluted before coating or cleaning a surface. Dilutions typically seen are 1:1 to 1:500, wherein 1 part of concentrate is added to 1 part water (or 500 parts water).

In the context of a composition, "solids" or "total solids" refers to the amount of solids, without a liquid carrier, unless specified otherwise.

In the context of a coating, a "hardened" coating refers to one that is dried upon removal of the water and optional organic solvents. The components of the coating form a network of silane(s) plus silicate(s) that are bonded together chemically and/or physically, including ionic bonding, hydrogen bonding, and/or covalent bonding.

Herein, a "metallic surface" refers to a surface that includes elemental metals or alloys of metals. The term also includes surface oxides of such elemental metal or alloy. This term does not include bulk oxides, such as alumina, silica, etc.

In the context of a surface, a "hydrophilic" surface is one that is wet by aqueous solutions, and does not express whether or not the layer absorbs aqueous solutions. Surfaces on which drops of water or aqueous solutions exhibit an advancing water contact angle of less than 45° are referred to as "hydrophilic" per ASTM D7334-08. Hydrophobic surfaces have a water contact angle of 90° or greater.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. For example, a composition that includes "a" surfactant may include "one or more" surfactants.

As used herein, the term "or" is generally employed in its sense including "and/or" unless the content clearly dictates otherwise. The term "and/or" means one or all of the listed elements or a combination of any two or more of the listed elements.

As used herein, all numbers are assumed to be modified by the term "about" and in certain embodiments by the term "exactly." Notwithstanding that the numerical ranges and parameters setting forth the broad scope of the invention are approximations, the numerical values set forth in the specific examples are reported as precisely as possible. All numerical values, however, inherently contain certain errors necessarily resulting from the standard deviation found in their respective testing measurements.

Also herein, the recitations of numerical ranges by endpoints include all numbers subsumed within that range (e.g., 1 to 5 includes 1, 1.5, 2, 2.75, 3, 3.80, 4, 5, etc.). Herein, "up to" a number (e.g., up to 50) includes the number (e.g., 50).

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one Y group is present in a formula, each Y group is independently selected. Furthermore, subgroups contained within these groups are also independently selected. For example, when each Y group contains an R, then each R is also independently selected.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated, linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" is a divalent alkyl group. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.). A group that may be the same or different is referred to as being "independently" something. Unless otherwise specified herein, all such groups typically have 100 or fewer carbon atoms, and often 50 or fewer carbon atoms.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure is directed to compositions and methods for coating, more particularly protecting, and optionally cleaning and protecting, metallic surfaces, and articles containing such surfaces, particularly those in a kitchen, for example.

Compositions of the present disclosure include a silicate, a non-zwitterionic anionic silane, and water. Depending on the use, compositions of the present disclosure may include a zwitterionic silane, a surfactant, and/or other optional components, such as an organic solvent, an alkalinity source, a water conditioning agent, a bleaching agent, and other optional additives (e.g., dyes, fragrances, corrosion inhibitors, enzymes, and/or thickeners).

Compositions of the present disclosure may be used for coating and protecting a metallic surface (e.g., a metal surface and/or a metal oxide surface). In certain embodiments, they may be used for cleaning and protecting a metallic surface in one step.

Compositions of the present disclosure may provide one or more of the following advantages: (1) the resultant coated surfaces attract less dirt (e.g., fingerprints, vegetable oil) than control or non-coated surfaces; (2) when dirt does collect, the coated surfaces can be more easily cleaned (e.g., using a simple wet cloth, water wash, or water dipping depending upon the harshness of the grime); and (3) the coated surfaces may not display an unsightly chalky residue from build-up of the coating.

In one embodiment of the present disclosure, a coating composition includes a silicate, a non-zwitterionic anionic silane, and water. In another embodiment, a coating composition includes a silicate, a non-zwitterionic anionic silane, a zwitterionic silane, and water. Such compositions are typically used for protecting a metallic surface.

In another embodiment, a coating composition includes a silicate, a non-zwitterionic anionic silane, a surfactant, and water. Such composition is typically used for cleaning and protecting a metallic surface.

Coating compositions of the present disclosure may be in the form of ready-to-use aqueous compositions or concentrated aqueous compositions. As used herein, the term "aqueous composition" refers to compositions containing water. Such compositions are typically solutions and may employ water as the only solvent or liquid carrier, or they may employ combinations of water and organic solvents such as alcohol and acetone to improve, for example, freeze-thaw stability.

Coating compositions of the present disclosure are preferably applied out of water using a ready-to-use composition to a metallic surface. A concentrated coating composition may need to be diluted, typically with water, to form a ready-to-use coating composition.

In some embodiments, coating compositions (i.e., compositions) of the present disclosure include water in an amount of at least 80 weight percent (wt-%), and often at least 90 wt-%, based on the total weight of a ready-to-use composition.

In some embodiments, compositions of the present disclosure include solids (e.g., the silane(s) and silicate(s) without their liquid carriers) in an amount of up to 20 wt-%, or up to 10 wt-%, or up to 8 wt-%, or up to 6 wt-%, or up to 4 wt-%, or up to 2 wt-%, or up to 1 wt-%, or up to 0.1 wt-%, or up to 0.001 wt-%, based on the total weight of a ready-to-use composition.

Compositions of the present disclosure may be provided in a variety of viscosities. Thus, for example, the viscosity may vary from a water-like thinness to a paste-like heaviness. They may also be provided in the form of gels, solids, or powders.

A composition of the present disclosure may be applied to a metallic surface using a variety of techniques, including, for example, spraying, brushing, rolling, dipping, knife-coating, die-coating, or combinations thereof. For cleaning a surface, contaminants may be removed by one of these methods, or additional wiping or scrubbing may be needed. The composition may be dried and hardened (and optionally cured) by simply letting the water evaporate, or by the application of heat, radiation, or a combination thereof.

Metallic surfaces refer to those surfaces that include elemental metals or alloys of metals and/or surface oxides of such metallic surfaces. Examples include stainless steel, aluminum, anodized aluminum, copper, titanium, zinc, silver, a surface oxide thereof, or combinations thereof (such as alloys, e.g., brass).

The present disclosure also provides articles that include a metallic surface. Examples of such articles include those in a home or commercial kitchen (e.g., refrigerator, dishwasher, stove, oven, microwave, exhaust hoods, fryers, grease traps, food-preparation tables, cabinets), in a restroom (e.g., toilet stall partitions, urinal partitions). Examples of such articles also include decorative or functional wall cladding such as in/on an elevator or escalator, walls in airports, hospitals, subway stations, train stations, malls, or in other commercial buildings. Examples of such articles also include decorative or functional panels in an automobile (e.g., decorative metallic parts in a car interior). Examples of such articles include consumer electronics, such as metal cases for electronic article (e.g., phones, tablets, and computers). Examples of such articles also include manufacturing equipment, and tools.

In one embodiment, an article is provided that includes a metallic surface having an aqueous (e.g., uncured) coating composition of the present disclosure disposed thereon. In another embodiment, an article is provided that includes a metallic surface having a coating disposed thereon, wherein the coating is applied by a method of the present disclosure. In another embodiment, an article is provided that includes a metallic surface having a hardened coating disposed thereon, wherein the hardened coating includes: a silicate; and a non-zwitterionic anionic silane; wherein the hardened coating is attached to the surface associatively, and is hydrophilic (i.e., with an advancing water contact angle of less than 45 degrees, or preferably less than 30 degrees, or less than 10 degrees).

A typical hardened coating is less than 1000 nm thick, or less than 500 nm thick, or less than 200 nm thick, or less than 100 nm thick, or less than 50 nm thick, or less than 10 nm thick.

Silicates

Compositions of the present disclosure include one or more silicates, which may provide enhanced durability to a coating through crosslinking, thereby providing protection to a metallic surface. Suitable silicates may be inorganic or organic silicates, or combinations thereof.

Examples of suitable inorganic silicates include lithium silicate, sodium silicate, potassium silicate, or combinations thereof. Lithium silicate is a preferred silicate.

Examples of suitable organic silicates include tetraalkoxysilane (e.g., tetraethylorthosilicate (TEOS)) and oligomers thereof such as alkyl polysilicates (e.g., poly(diethoxysiloxane)).

In some embodiments, compositions of the present disclosure include a silicate in an amount of greater than 0 weight percent (wt-%), or at least 1 wt-%, or at least 5 wt-%, or at least 10 wt-%, or at least 15 wt-%, or at least 20 wt-%, or at least 25 wt-%, or at least 30 wt-%, based on the total weight of silane(s) and silicate(s) solids (i.e., without the liquid carrier(s)) in a composition, whether it is a concentrated or a ready-to-use composition. In some embodiments, compositions of the present disclosure include a silicate in an amount of up to 50 wt-%, or up to 45 wt-%, or up to 40 wt-%, or up to 35 wt-%, based on the total weight of silicate(s) plus silane(s) solids (i.e., without the liquid carrier(s)) in a composition, whether it is a concentrated or a ready-to-use composition.

Non-zwitterionic Anionic Silanes

Compositions of the present disclosure include one or more non-zwitterionic anionic silanes. Non-zwitterionic anionic silanes (i.e., silanes without electrical charges of opposite sign within a molecule) include those with associative functional groups that adhere to a metallic surface.

Associative functional groups provide associative bonding of the coating to the metallic surface. Such associative bonding includes chelating bonding modes, thereby attaching a hardened coating to a metallic surface associatively. As shown in FIG. 12 of Angew. Chem. Int. Ed. 2014, 53, 6322-6356, which is reproduced below, the binding modes of exemplary phosphonic acid functional groups to a metal oxide surface (M) are shown, including monodentate (a and b), bridging bidentate (c and d), bridging tridentate (e), chelating bidentate (f and g), chelating tridentate (h), and additional hydrogen-bonding interactions (i-l).

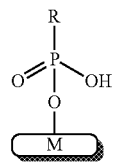
a

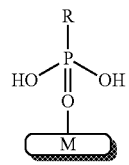
b

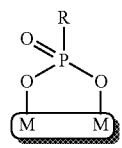
c

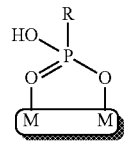
d

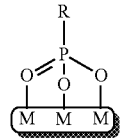
e

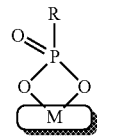
f

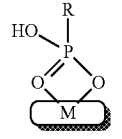
g

-continued

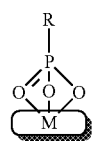
h

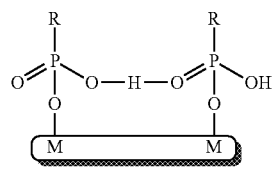
i

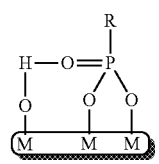
j

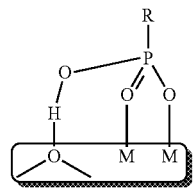
k

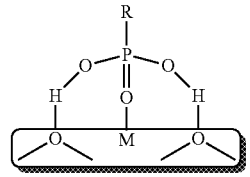
l

Thus, these compounds are used in compositions of the present disclosure as adhesion promoters to a metallic surface.

Examples of such non-zwitterionic anionic silanes include a non-zwitterionic sulfonate-functional silane, a non-zwitterionic carboxylate-functional silane, a non-zwitterionic phosphate-functional silane, a non-zwitterionic phosphonic acid-functional silane, a non-zwitterionic phosphonate-functional silane, or a combination thereof.

In certain embodiments, the non-zwitterionic anionic compounds used in the compositions of the present disclosure have the following Formula (I):

$$[(MO)(Q^2)_n Si(XCH_2 V^{t-})_{3-n}] Y_{2/nr}^{+r} \quad (I)$$

wherein:

each $Q^2$ is independently selected from hydroxyl, alkyl groups containing from 1 to 4 carbon atoms, and alkoxy groups containing from 1 to 4 carbon atoms;

M is selected from hydrogen, alkali metals, and organic cations of strong organic bases having an average molecular weight of less than 150 and a pKa of greater than 11;

X is an organic linking group;

$V^{t-}$ is $-SO_3^-$, $-CO_2^-$, $-OPO_3^{2-}$, $-PO_3^{2-}$, $-OP(=O)(R)O^-$, or a combination thereof, wherein t is 1 or 2, and R is an aliphatic, aromatic, branched, linear, cyclic, or heterocyclic group (preferably having 20 carbons or less, more preferably R is aliphatic having 20 carbons or less, and even more preferably R is methyl, ethyl, propyl, or butyl);

Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+N(CH_3)_4$, $^+N(CH_2CH_3)_4$), provided that M is hydrogen when Y is selected from hydrogen, alkaline earth metals and organic cations of said protonated weak bases;

r is equal to the valence of Y; and n is 1 or 2.

Preferably, the non-zwitterionic anionic compound of Formula (I) is an alkoxysilane compound (e.g., wherein $Q^2$ is an alkoxy group containing from 1 to 4 carbon atoms).

The weight percentage of oxygen in these compounds of Formula (I) is at least 30%, or at least 40%. Preferably, it is in the range of 45% to 55%. The weight percentage of silicon in these compounds is no greater than 15%. Each of these percentages is based on the weight of the compound in the water-free acid form.

In certain embodiments, the organic linking group X of Formula (I) may be selected from alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups. Preferably, X is selected from alkylene groups, hydroxy-substituted alkylene groups and hydroxy-substituted mono-oxa alkylene groups.

Sulfonate-functional silane compounds have an alkoxysilane- and/or silanol-functional group (which can bond to a substrate surface) and a sulfonate group ($-SO_3^-$) (which can render a substrate surface hydrophilic). Examples include non-zwitterionic sulfonate-functional silane compounds such as those disclosed in U.S. Pat. No. 4,152,165 (Langager et al.) and U.S. Pat. No. 4,338,377 (Beck et al.), and include, for example, the following:

(HO)$_3$Si—CH$_2$CH$_2$CH$_2$—O—CH$_2$—CH(OH)—CH$_2$SO$_3^-$H$^+$;
(HO)$_3$Si—CH$_2$CH(OH)—CH$_2$SO$_3^-$H$^+$;
(HO)$_3$Si—CH$_2$CH$_2$CH$_2$SO$_3^-$H$^+$;
(HO)$_3$Si—C$_6$H$_4$—CH$_2$CH$_2$SO$_3^-$H$^+$;
(HO)$_2$Si—[CH$_2$CH$_2$SO$_3^-$H$^+$]$_2$;
(HO)—Si(CH$_3$)$_2$—CH$_2$CH$_2$SO$_3^-$H$^+$;
(NaO)(HO)$_2$Si—CH$_2$CH$_2$CH$_2$—O—CH$_2$—CH(OH)—CH$_2$SO$_3^-$Na$^+$; and
(HO)$_3$Si—CH$_2$CH$_2$SO$_3^-$K$^+$.

Phosphonate-functional silane compounds have an alkoxysilane- and/or silanol-functional group (which can bond to a substrate surface) and a phosphonate group ($-OP(=O)(R)O^-$, wherein R can be aliphatic, aromatic, branched, linear, or cyclic, or heterocycle) (which can render a substrate surface hydrophilic). Examples include non-zwitterionic phosphonate-functional silane compounds, such as those commercially available from multiple vendors, including, for example, Dow and Gelest. In certain embodiments, the non-zwitterionic phosphonate-containing compounds used in compositions of the present disclosure include:

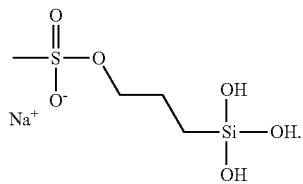

Carboxylate-functional silane compounds have an alkoxysilane- and/or silanol-functional group (which can bond to a substrate surface) and a carboxylate group ($-CO_2^-$) (which can render a substrate surface hydrophilic). Examples include non-zwitterionic carboxylate-functional silane compounds, such as those commercially available from multiple vendors, including, for example, Dow and Gelest. In certain embodiments, the non-zwitterionic carboxylate-containing compounds used in compositions of the present disclosure include:

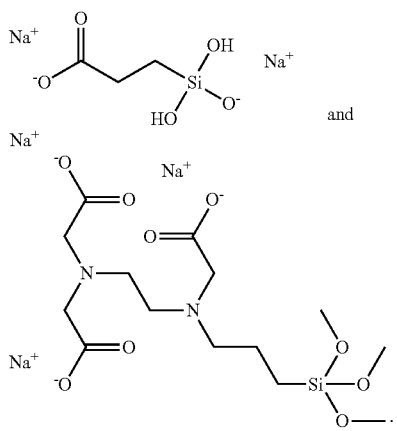

Phosphate-functional silane compounds have an alkoxysilane- and/or silanol-functional group (which can bond to a substrate surface) and a phosphate group ($-OPO_3^{2-}$) (which can render a substrate surface hydrophilic). In certain embodiments, the non-zwitterionic phosphate-containing compounds used in compositions of the present disclosure include:

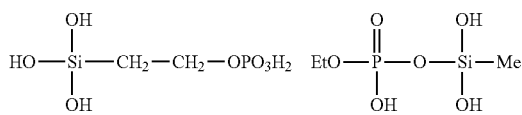

Phosphonic acid-functional silane compounds have an alkoxysilane- and/or silanol-functional group (which can bond to a substrate surface) and a phosphonic acid group ($-PO_3^{2-}$) (which can render a substrate surface hydrophilic). In certain embodiments, the non-zwitterionic phosphonic acid-containing compounds used in compositions of the present disclosure include:

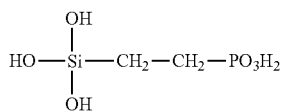

In some embodiments, compositions of the present disclosure include a non-zwitterionic anionic silane compound in an amount of at least 0.0001 weight percent (wt-%), or at least 0.001 wt-%, or at least 0.01 wt-%, or at least 0.05 wt-%, based on the total weight of a ready-to-use composition. In some embodiments, compositions of the present disclosure include a non-zwitterionic anionic silane compound in an amount of up to 10 wt-%, or up to 5 wt-%, or up to 2 wt-%, based on the total weight of a ready-to-use composition.

In some embodiments, compositions of the present disclosure include a non-zwitterionic anionic silane compound in an amount of at least 0.0001 weight percent (wt-%), or at least 0.001 wt-%, or at least 0.01 wt-%, or at least 0.1 wt-%, or at least 0.5 wt-%, based on the total weight of a concentrated composition. In some embodiments, compositions of the present disclosure include a non-zwitterionic anionic silane compound in an amount of up to 20 wt-%, or up to 15 wt-%, or up to 10 wt-%, based on the total weight a concentrated composition.

Zwitterionic Silanes

Certain compositions of the present disclosure include one or more zwitterionic silanes. Zwitterionic silanes are neutral compounds that have electrical charges of opposite sign within a molecule, as described in http://goldbook.i-upac.org/Z06752.html. Such compounds provide easy-to-clean performance to the compositions.

Suitable zwitterionic silanes include a zwitterionic sulfonate-functional silane, a zwitterionic carboxylate-functional silane, a zwitterionic phosphate-functional silane, a zwitterionic phosphonic acid-functional silane, a zwitterionic phosphonate-functional silane, or a combination thereof. In certain embodiments, the zwitterionic silane is a zwitterionic sulfonate-functional silane.

In certain embodiments, the zwitterionic silane compounds used in the present disclosure have the following Formula (II) wherein:

$$(R^1O)_p—Si(Q^1)_q-W—N^+(R^2)(R^3)—(CH_2)_m—Z^{t-} \quad (II)$$

wherein:
each $R^1$ is independently a hydrogen, methyl group, or ethyl group;
each $Q^1$ is independently selected from hydroxyl, alkyl groups containing from 1 to 4 carbon atoms, and alkoxy groups containing from 1 to 4 carbon atoms;
each $R^2$ and $R^3$ is independently a saturated or unsaturated, straight chain, branched, or cyclic organic group (preferably having 20 carbons or less), which may be joined together, optionally with atoms of the group W, to form a ring;
W is an organic linking group;
$Z^{t-}$ is $—SO_3^-$, $—CO_2^-$, $—OPO_3^{2-}$, $—PO_3^{2-}$, $—OP(=O)(R)O^-$, or a combination thereof, wherein t is 1 or 2, and R is an aliphatic, aromatic, branched, linear, cyclic, or heterocyclic group (preferably having 20 carbons or less, more preferably R is aliphatic having 20 carbons or less, and even more preferably R is methyl, ethyl, propyl, or butyl);
p and m are integers of 1 to 10 (or 1 to 4, or 1 to 3);
q is 0 or 1; and
p+q=3.

In certain embodiments, the organic linking group W of Formula (II) may be selected from saturated or unsaturated, straight chain, branched, or cyclic organic groups. The linking group W is preferably an alkylene group, which may include carbonyl groups, urethane groups, urea groups, heteroatoms such as oxygen, nitrogen, and sulfur, and combinations thereof. Examples of suitable linking groups W include alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups.

Suitable examples of zwitterionic compounds of Formula (II) are described in U.S. Pat. No. 5,936,703 (Miyazaki et al.) and International Publication Nos. WO 2007/146680 and WO 2009/119690, and include the following zwitterionic functional groups ($—W—N^+(R^3)(R^4)—(CH_2)_m—SO_3^-$):

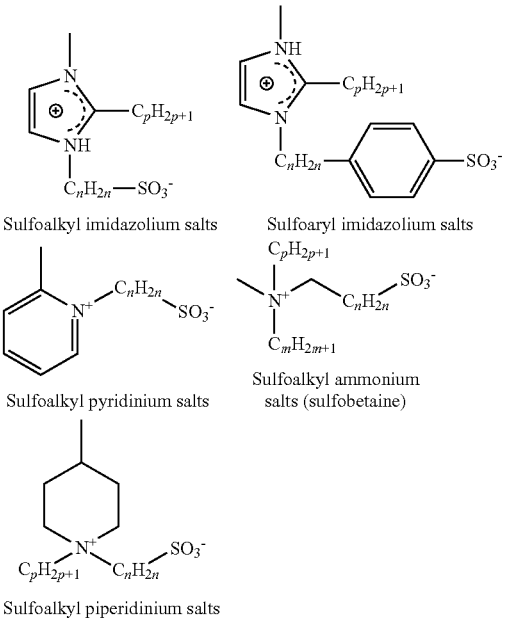

Sulfoalkyl imidazolium salts  Sulfoaryl imidazolium salts

Sulfoalkyl pyridinium salts  Sulfoalkyl ammonium salts (sulfobetaine)

Sulfoalkyl piperidinium salts

In certain embodiments, the zwitterionic sulfonate-functional silane compounds used in the present disclosure have the following Formula (III) wherein:

$$(R^1O)_p—Si(Q^1)_q-CH_2CH_2CH_2—N^+(CH_3)_2—(CH_2)_m—SO_3^- \quad (III)$$

wherein:
each $R^1$ is independently a hydrogen, methyl group, or ethyl group;
each $Q^1$ is independently selected from hydroxyl, alkyl groups containing from 1 to 4 carbon atoms and alkoxy groups containing from 1 to 4 carbon atoms;
p and m are integers of 1 to 4;
q is 0 or 1; and
p+q=3.

Suitable examples of zwitterionic sulfonate-functional compounds of Formula (III) are described in U.S. Pat. No. 5,936,703 (Miyazaki et al.), including, for example:
$(CH_3O)_3Si—CH_2CH_2CH_2—N^+(CH_3)_2—CH_2CH_2CH_2—SO_3^-$; and
$(CH_3CH_2O)_2Si(CH_3)—CH_2CH_2CH_2—N^+(CH_3)_2—CH_2CH_2CH_2—SO_3^-$.

Other examples of suitable zwitterionic sulfonate-functional compounds, which may be made using standard techniques include the following:

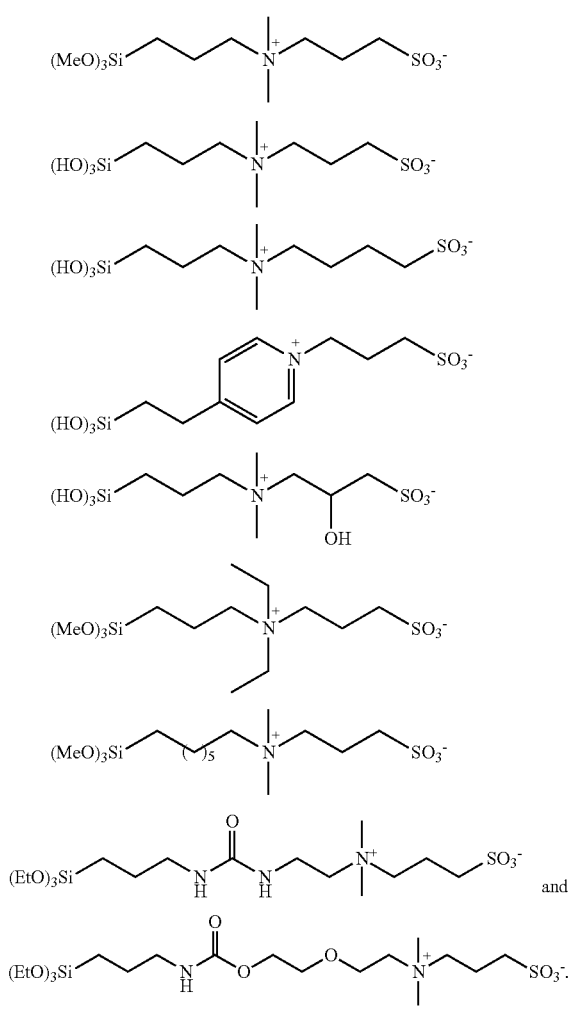

Preferred examples of suitable zwitterionic sulfonate-functional silane compounds for use in the present disclosure are described in the Experimental Section. A particularly preferred zwitterionic sulfonate-functional silane is:

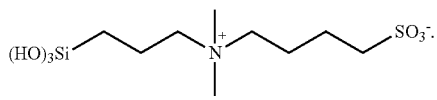

Examples of zwitterionic carboxylate-functional silane compounds include

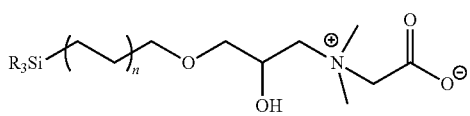

wherein each R is independently OH or alkoxy, and n is 1-10.

Examples of zwitterionic phosphate-functional silane compounds include:

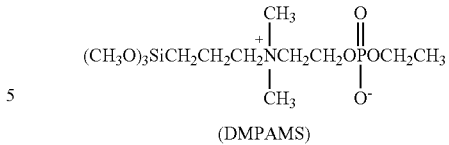

(DMPAMS)

(N,N-dimethyl, N-(2-ethyl phosphate ethyl)-aminopropyl-trimethoxysilane (DMPAMS)).

Examples of zwitterionic phosphonate-functional silane compounds include:

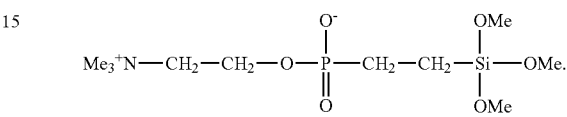

In some embodiments, compositions of the present disclosure include a zwitterionic silane compound in an amount of at least 0.0001 weight percent (wt-%), or at least 0.001 wt-%, or at least 0.01 wt-%, or at least 0.05 wt-%, based on the total weight of a ready-to-use composition. In some embodiments, compositions of the present disclosure include a zwitterionic silane compound in an amount of up to 10 wt-%, or up to 5 wt-%, or up to 2 wt-%, based on the total weight of a ready-to-use composition.

In some embodiments, compositions of the present disclosure include a zwitterionic silane compound in an amount of at least 0.0001 weight percent (wt-%), or at least 0.001 wt-%, or at least 0.01 wt-%, or at least 0.1 wt-%, or at least 0.5 wt-%, based on the total weight of a concentrated composition. In some embodiments, compositions of the present disclosure include a zwitterionic silane compound in an amount of up to 20 wt-%, or up to 15 wt-%, or up to 10 wt-%, based on the total weight of a concentrated composition.

Surfactants

Compositions of the present disclosure can also include one or more surfactants. Surfactants are particularly desirable for use in cleaning compositions.

A variety of surfactants may be used in a composition, such as anionic, nonionic, cationic, and zwitterionic surfactants. Suitable surfactants that may be used are commercially available from a number of sources. For a discussion of suitable surfactants, see Kirk-Othmer, Encyclopedia of Chemical Technology, Third Edition, volume 8, pages 900-912.

Nonionic surfactants include, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the tradename PLURONIC (BASF-Wyandotte), and the like; and other like nonionic compounds. Silicone surfactants such as those available under the tradename ABIL B8852 can also be used.

Preferred surfactants are any of a broad variety of nonionic ethylene oxide (EO) containing surfactants. Many nonionic ethylene oxide derivative surfactants are water soluble and have cloud points below the intended use temperature of the compositions of the present disclosure. In addition, where the composition is preferred to be biodegradable, the defoamers are also selected to be biodegradable.

Some examples of ethylene oxide derivative surfactants that may be used in compositions of the present disclosure include polyoxyethylene-polyoxypropylene block copolymers, alcohol alkoxylates, low molecular weight EO containing surfactants, or the like, or derivatives thereof. Some examples of polyoxyethylene-polyoxypropylene block copolymers include those having the following formulae:

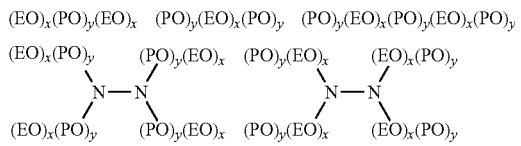

wherein EO represents an ethylene oxide group, PO represents a propylene oxide group, and x and y reflect the average molecular proportion of each alkylene oxide monomer in the overall block copolymer composition. In some embodiments, x is in the range of 10 to 130, y is in the range of 15 to 70, and x plus y is in the range of 25 to 200. It should be understood that each x and y in a molecule may be different. In some embodiments, the total polyoxyethylene component of the block copolymer may be at least 20 mole percent (mol-%) of the block copolymer and in some embodiments, at least 30 mol-% of the block copolymer. In some embodiments, the material may have a molecular weight greater than 400, and in some embodiments, greater than 500. For example, in some embodiments, the material may have a molecular weight in the range of 500 to 7000 or more, or in the range of 950 to 4000 or more, or in the range of 1000 to 3100 or more, or in the range of 2100 to 6700 or more.

Although the exemplary polyoxyethylene-polyoxypropylene block copolymer structures provided above have 3-8 blocks, it should be appreciated that the nonionic block copolymer surfactants can include more or less than 3 or 8 blocks. In addition, the nonionic block copolymer surfactants can include additional repeating units such as butylene oxide repeating units. Furthermore, the nonionic block copolymer surfactants that may be used according to the present disclosure may be characterized hetero-polyoxyethylene-polyoxypropylene block copolymers. Some examples of suitable block copolymer surfactants include commercial products such as those surfactants available under the tradenames PLURONIC and TETRONIC from BASF. For example, PLURONIC 25-R4 is one example of a useful block copolymer surfactant commercially available from BASF, that is biodegradable and GRAS (generally recognized as safe).

Suitable anionic surfactants include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Exemplary anionic surfactants include sodium alkylarylsulfonate, alpha-olefinsulfonate, and fatty alcohol sulfates.

Suitable cationic surfactants include, for example, amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, a naphthylene-substituted quaternary ammonium chloride such as dimethyl-1-naphthylmethylammonium chloride, and the like. The cationic surfactant may be used to provide sanitizing properties.

Suitable zwitterionic surfactants include, for example, betaines, imidazolines, and propinates.

In some embodiments, compositions of the present disclosure include a surfactant in an amount of at least 0.001 wt-%, or at least 0.01 wt-%, or at least 0.1 wt-%, or at least 1 wt-%, or at least 2 wt-%, or at least 3 wt-%, based on the total weight of already-to-use composition. In some embodiments, compositions of the present disclosure, include a surfactant in an amount of up to 10 wt-%, or up to 5 wt-%, or up to 3 wt-%, or up to 1 wt-%, based on the total weight of a ready-to-use composition.

In some embodiments, compositions of the present disclosure include a surfactant in an amount of at least 0.001 wt-%, or at least 1 wt-%, or at least 5 wt-%, or at least 10 wt-%, based on the total weight of a concentrated composition. In some embodiments, compositions of the present disclosure, include a surfactant in an amount of up to 50 wt-%, or up to 20 wt-%, or up to 10 wt-%, or up to 5 wt-%, based on the total weight of a concentrated composition.

Optional Organic Solvents

Certain embodiments of compositions of the present disclosure may include one or more organic solvents. These may be added to assist in solubilizing components and/or to enhance the cleaning capability of a composition.

Representative solvents and solvent systems may include one or more different solvents including acetone, aliphatic or aromatic alcohols, alkanol amines, ether amines, esters, and mixtures thereof. Representative solvents may include acetone, acetamidophenol, acetanilide, acetophenone, 2-acetyl-1-methylpyrrole, benzyl acetate, benzyl alcohol, methyl benzyl alcohol, alpha phenyl ethanol, benzyl benzoate, benzyloxyethanol, ethylene glycol phenyl ether (commercially available as DOWANOL EPh from Dow Chemical Co.), propylene glycol phenyl ether (commercially available as DOWANOL PPh from Dow Chemical Co.), amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-I-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL™ from Dow Chemical Co.), propylene glycol monobutyl ether (commercially available as Butyl PROPASOL from Dow Chemical Co.), ethyl 3-ethoxypropionate (commercially available as UCAR Ester EEP from Dow Chemical Co.), 2,2,4-Trimethyl-1,3-Pentanediol Monoisobutyrate (commercially available as UCAR Filmer IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate.

In some embodiments, compositions of the present disclosure include alcohol and/or other organic solvents in an amount of at least 0.01 weight percent (wt-%), and often at least 2 wt-%, based on the total weight of a ready-to-use composition. In some embodiments, compositions of the present disclosure include alcohol and/or other organic solvents in an amount of up to 50 wt-%, and often up to 25 wt-%, based on the total weight of a ready-to-use composition.

In some embodiments, compositions of the present disclosure include alcohol and/or other organic solvents in an amount of at least 1 weight percent (wt-%), and often at least 10 wt-%, based on the total weight of a concentrated composition. In some embodiments, compositions of the present disclosure include alcohol and/or other organic solvents in an amount of up to 90 wt-%, and often up to 60 wt-%, based on the total weight of a concentrated composition.

Optional Alkalinity Sources

Certain embodiments of compositions of the present disclosure may include one or more alkalinity (i.e., alkaline) sources.

Examples of suitable alkaline sources for use in the compositions according to the present disclosure include amines, alkanol amines, carbonates, and silicates. For example, the source of alkalinity can include sodium silicate, sodium metasilicate, sodium orthosilicate, sodium phosphate, sodium polyphosphate, sodium borate, sodium carbonate, potassium silicate, potassium metasilicate, potassium orthosilicate, potassium phosphate, potassium polyphosphate, potassium borate, potassium carbonate, lithium silicate, lithium metasilicate, lithium orthosilicate, lithium phosphate, lithium polyphosphate, lithium borate, lithium carbonate, 2-(2-aminoethoxy) ethanol, monoethanolamine, diethanolamine, triethanolamine, mixed isopropanolamines, morpholine, n,n-dimethyl ethanolamine, and combinations thereof.

When a composition of the present disclosure includes an alkalinity source, it may be included in an amount of at least 0.01 wt-%, or at least 1 wt-%, or at least 5 wt-%, based on the total weight of a concentrated composition. When a composition of the present disclosure includes an alkalinity source, it may be included in an amount of up to 40 wt-%, or up to 30 wt-%, or up to 10 wt-%, based on the total weight of a concentrated composition.

Optional Water Conditioning Agents

Certain embodiments of compositions of the present disclosure may include one or more water conditioning agents. Water conditioning agents aid in removing metal compounds and in reducing harmful effects of hardness components in service water.

Exemplary water conditioning agents include chelating agents, sequestering agents, and inhibitors. Polyvalent metal cations or compounds such as a calcium, a magnesium, an iron, a manganese, a molybdenum, etc., cation or compound, or mixtures thereof, can be present in service water and in complex soils. Such compounds or cations can interfere with the effectiveness of a washing or rinsing compositions during a cleaning application. A water conditioning agent can effectively complex and remove such compounds or cations from soiled surfaces and can reduce or eliminate the inappropriate interaction with active ingredients including the nonionic surfactants and anionic surfactants of the present disclosure. Both organic and inorganic water conditioning agents are common and can be used. Inorganic water conditioning agents include such compounds as sodium tripolyphosphate and other higher linear and cyclic polyphosphates species. Organic water conditioning agents include both polymeric and small molecule water conditioning agents. Organic small molecule water conditioning agents are typically organocarboxylate compounds or organophosphate water conditioning agents. Polymeric inhibitors commonly comprise polyanionic compositions such as polyacrylic acid compounds. Small molecule organic water conditioning agents include, but are not limited to, sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium, and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N N-diacetic acid trisodium salt (MGDA), and iminodisuccinate sodium salt (IDS). Suitable water conditioning agents are commercially available.

When a composition of the present disclosure includes a water conditioning agent, it may be included in an amount of at least 0.01 wt-%, or at least 0.1 wt-%, or at least 1 wt-%, based on the total weight of a concentrated composition. When a composition of the present disclosure includes a water conditioning agent, it may be included in an amount of up to 40 wt-%, or up to 20 wt-%, or up to 10 wt-%, or up to 5 wt-%, based on the total weight of a concentrated composition.

Optional Bleaching Agents

Certain embodiments of compositions of the present disclosure may include one or more bleaching agents. Bleaching agents may be included for lightening or whitening a substrate.

Examples of suitable bleaching agents include bleaching compounds capable of liberating an active halogen species (such as $Cl_2$, $Br_2$, $OCl^-$, and/or $OBr^-$) under conditions typically encountered during the cleansing process. Suitable bleaching agents for use in the present compositions include, for example, chlorine-containing compounds such as a chlorine, a hypochlorite, and chloramine. Exemplary halogen-releasing compounds include the alkali metal dichloroisocyanurates, chlorinated trisodium phosphate, the alkali metal hypochlorites, monochloramine and dichloramine, and the like. Encapsulated chlorine sources may also be used to enhance the stability of the chlorine source in the composition (see, for example, U.S. Pat. No. 4,830,773 (Olson)). A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like.

When a composition of the present disclosure includes a bleaching agent, it may be included in an amount of at least 0.1 wt-%, or at least 1 wt-%, or at least 3 wt-%, based on the total weight of a concentrated composition. When a composition of the present disclosure includes a bleaching agent, it may be included in an amount of up to 60 wt-%, or up to 20 wt-%, or up to 8 wt-%, or up to 6 wt-%, based on the total weight of a concentrated composition.

Other Optional Additives

Certain embodiments of compositions of the present disclosure may include one or more other additives. Suitable additives according to the present disclosure may include, for example, dyes (product safety/identification), fragrances, corrosion inhibitors, enzymes, and/or thickeners. Suitable thickeners may include, for example, gums (e.g., xanthan, carrageenan, etc.), polymers (e.g., polyacrylates and similar modified polymers), inorganic particles (e.g., clay silicates such as LAPONITE).

Various additional additives suitable for use according to the present disclosure are disclosed in U.S. Pat. No. 6,916,773 (Griese et al.) and U.S. Pat. No. 8,772,215 (Ryther et al.), and U.S. Pat. App. Pub. Nos. 2010/0317559 (Ryther et al.), 2012/0295829 (Peitersen et al.), and 2013/0023458 (Hodge et al.).

Illustrative Embodiments

Embodiment 1 is an aqueous coating composition comprising: a zwitterionic silane; greater than 0 wt-% and up to 50 wt-% of a silicate; a non-zwitterionic anionic silane; and water; wherein the weight percent of silicate is based on the total weight of solids in the composition, whether the composition is a ready-to-use composition or a concentrated composition.

Embodiment 2 is the composition of embodiment 1 wherein the zwitterionic silane comprises a zwitterionic sulfonate-functional silane, a zwitterionic carboxylate-functional silane, a zwitterionic phosphate-functional silane, a zwitterionic phosphonic acid-functional silane, a zwitterionic phosphonate-functional silane, or a combination thereof. In certain embodiments, the zwitterionic silane is a zwitterionic sulfonate-functional silane.

Embodiment 3 is the composition of embodiment 1 or 2 wherein the zwitterionic silane has the following formula (Formula II):

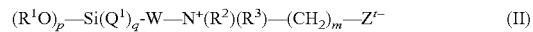

wherein:
each $R^1$ is independently a hydrogen, methyl group, or ethyl group;
each $Q^1$ is independently selected from hydroxyl, alkyl groups containing from 1 to 4 carbon atoms, and alkoxy groups containing from 1 to 4 carbon atoms;
each $R^2$ and $R^3$ is independently a saturated or unsaturated, straight chain, branched, or cyclic organic group, which may be joined together, optionally with atoms of the group W, to form a ring;
W is an organic linking group;
$Z^{t-}$ is —$SO_3^-$, —$CO_2^-$, —$OPO_3^{2-}$, —$PO_3^{2-}$, —OP(=O)(R)O$^-$, or a combination thereof, wherein t is 1 or 2, and R is an aliphatic, aromatic, branched, linear, cyclic, or heterocyclic group, or a combination thereof;
p and m are integers of 1 to 10;
q is 0 or 1; and
p+q=3.

Embodiment 4 is the composition of any of embodiments 1 through 3 wherein the silicate is an inorganic silicate.

Embodiment 5 is the composition of embodiment 4 wherein the silicate is selected from lithium silicate, sodium silicate, potassium silicate, or a combination thereof.

Embodiment 6 is the composition of any of embodiments 1 through 5 wherein the non-zwitterionic anionic silane comprises one or more associative functional groups.

Embodiment 7 is the composition of embodiment 6 wherein the non-zwitterionic anionic silane comprises a non-zwitterionic sulfonate-functional silane, a non-zwitterionic carboxylate-functional silane, a non-zwitterionic phosphate-functional silane, a non-zwitterionic phosphonic acid-functional silane, a non-zwitterionic phosphonate-functional silane, or a combination thereof.

Embodiment 8 is the composition of any of embodiments 1 through 7 wherein the non-zwitterionic anionic silane has the following formula (Formula I):

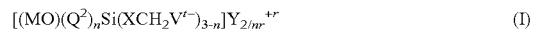

wherein:
each $Q^2$ is independently selected from hydroxyl, alkyl groups containing from 1 to 4 carbon atoms, and alkoxy groups containing from 1 to 4 carbon atoms;
M is selected from hydrogen, alkali metals, and organic cations of strong organic bases having an average molecular weight of less than 150 and a pKa of greater than 11;
X is an organic linking group;
$V^{t-}$ is —SO$_3^-$, —CO$_2^-$, —OPO$_3^{2-}$, —PO$_3^{2-}$, —OP(=O)(R)O$^-$, or a combination thereof, wherein t is 1 or 2, and R is an aliphatic, aromatic, branched, linear, cyclic, or heterocyclic group, or a combination thereof;
Y is selected from hydrogen, alkaline earth metals, organic cations of protonated weak bases having an average molecular weight of less than 200 and a pKa of less than 11, alkali metals, and organic cations of strong organic bases having an average molecular weight of less than 150 and a pKa of greater than 11, provided that M is hydrogen when Y is selected from hydrogen, alkaline earth metals and organic cations of said protonated weak bases;
r is equal to the valence of Y; and
n is 1 or 2.

Embodiment 9 is the composition of any one of embodiments 1 through 8 wherein the zwitterionic silane is present in an amount of 0.0001 wt-% to 10 wt-%, based on the total weight of solids in a ready-to-use composition.

Embodiment 10 is the composition of any one of embodiments 1 through 9 wherein the non-zwitterionic anionic silane is present in an amount of 0.0001 wt-% to 10 wt-%, based on the total weight of solids in a ready-to-use composition.

Embodiment 11 is a method of protecting a metallic surface, the method comprising: providing a coating composition, optionally diluting the coating composition, if concentrated, to a ready-to-use composition; applying the ready-to-use composition to a metallic surface; and allowing the ready-to-use composition to dry on the metallic surface. The coating composition comprises: greater than 0 wt-% and up to 50 wt-% of a silicate; a non-zwitterionic anionic silane; and water; wherein the weight percent of silicate is based on the total weight of solids in the composition, whether the composition is a ready-to-use composition or a concentrated composition.

Embodiment 12 is the method of embodiment 11 wherein the composition further comprises a zwitterionic silane.

Embodiment 13 is the method of embodiment 12 wherein the zwitterionic silane comprises a zwitterionic sulfonate-functional silane, a zwitterionic carboxylate-functional silane, a zwitterionic phosphate-functional silane, a zwitterionic phosphonic acid-functional silane, a zwitterionic phosphonate-functional silane, or a combination thereof.

Embodiment 14 is the method of embodiment 12 or 13 wherein the zwitterionic silane has the following formula (Formula II):

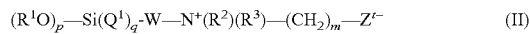   (II)

wherein:
each $R^1$ is independently a hydrogen, methyl group, or ethyl group;
each $Q^1$ is independently selected from hydroxyl, alkyl groups containing from 1 to 4 carbon atoms, and alkoxy groups containing from 1 to 4 carbon atoms;
each $R^2$ and $R^3$ is independently a saturated or unsaturated, straight chain, branched, or cyclic organic group, which may be joined together, optionally with atoms of the group W, to form a ring;
W is an organic linking group;
$Z^{t-}$ is —SO$_3^-$, —CO$_2^-$, —OPO$_3^{2-}$, —PO$_3^{2-}$, —OP(=O)(R)O$^-$, or a combination thereof, wherein t is 1 or 2, and R is an aliphatic, aromatic, branched, linear, cyclic, or heterocyclic group, or a combination thereof;
p and m are integers of 1 to 10;
q is 0 or 1; and
p+q=3.

Embodiment 15 is the method of any one of embodiments 11 through 14 wherein the silicate is an inorganic silicate.

Embodiment 16 is the method of embodiment 15 wherein the silicate is selected from lithium silicate, sodium silicate, potassium silicate, or a combination thereof.

Embodiment 17 is the method of any one of embodiments 11 through 16 wherein the non-zwitterionic anionic silane comprises one or more associative functional groups.

Embodiment 18 is the method of embodiment 17 wherein the non-zwitterionic anionic silane comprise a non-zwitterionic sulfonate-functional silane, a non-zwitterionic carboxylate-functional silane, a non-zwitterionic phosphate-functional silane, a non-zwitterionic phosphonic acid-functional silane, a non-zwitterionic phosphonate-functional silane, or a combination thereof.

Embodiment 19 is the method of embodiment 17 or 18 wherein the non-zwitterionic anionic silane has the following formula (Formula I):

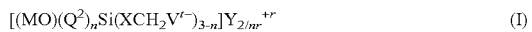   (I)

wherein:
each $Q^2$ is independently selected from hydroxyl, alkyl groups containing from 1 to 4 carbon atoms, and alkoxy groups containing from 1 to 4 carbon atoms;
M is selected from hydrogen, alkali metals, and organic cations of strong organic bases having an average molecular weight of less than 150 and a pKa of greater than 11;
X is an organic linking group;
$V^{t-}$ is —SO$_3^-$, —CO$_2^-$, —OPO$_3^{2-}$, —PO$_3^{2-}$, —OP(=O)(R)O$^-$, or a combination thereof, wherein t is 1 or 2, and R is an aliphatic, aromatic, branched, linear, cyclic, or heterocyclic group, or a combination thereof;
Y is selected from hydrogen, alkaline earth metals, organic cations of protonated weak bases having an average molecular weight of less than 200 and a pKa of less than 11, alkali metals, and organic cations of strong organic bases having an average molecular weight of less than 150 and a pKa of greater than 11, provided that M is hydrogen when Y is selected from hydrogen, alkaline earth metals and organic cations of said protonated weak bases;
r is equal to the valence of Y; and
n is 1 or 2.

Embodiment 20 is the method of any of embodiments 11 through 19 wherein the non-zwitterionic anionic silane is present in the composition in an amount of 0.0001 wt-% to 10 wt-%, based on the total weight of solids in a ready-to-use composition.

Embodiment 21 is the method of any of embodiments 11 through 20 wherein the metallic surface comprises stainless steel, aluminum, anodized aluminum, titanium, zinc, silver, a surface oxide thereof, or a combination thereof.

Embodiment 22 is a method of cleaning and protecting a metallic surface having contaminants thereon, the method comprising: providing a coating composition; optionally, diluting the coating composition, if concentrated, to a readyto-use composition; applying the ready-to-use composition to a metal-containing surface under conditions effective to remove contaminants from the metallic surface; and allowing the ready-to-use composition to dry on the metallic surface. The coating composition comprises: greater than 0 wt-% and up to 50 wt-% of a silicate; a non-zwitterionic anionic silane; a surfactant; and water; wherein the weight percent of silicate is based on the total weight of silane(s) plus silicate(s) in the composition, whether the composition is a ready-to-use composition or a concentrated composition.

Embodiment 23 is the method of embodiment 22 wherein the composition further comprises a zwitterionic silane.

Embodiment 24 is the method of embodiment 23 wherein the zwitterionic silane comprises a zwitterionic sulfonate-functional silane, a zwitterionic carboxylate-functional silane, a zwitterionic phosphate-functional silane, a zwitterionic phosphonic acid-functional silane, a zwitterionic phosphonate-functional silane, or a combination thereof.

Embodiment 25 is the method of embodiment 23 or 24 wherein the zwitterionic silane has the following formula (Formula II):

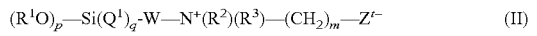

wherein:
each $R^1$ is independently a hydrogen, methyl group, or ethyl group;
each $Q^1$ is independently selected from hydroxyl, alkyl groups containing from 1 to 4 carbon atoms, and alkoxy groups containing from 1 to 4 carbon atoms;
each $R^2$ and $R^3$ is independently a saturated or unsaturated, straight chain, branched, or cyclic organic group, which may be joined together, optionally with atoms of the group W, to form a ring;
W is an organic linking group;
$Z^{t-}$ is $-SO_3^-$, $-CO_2^-$, $-OPO_3^{2-}$, $-PO_3^{2-}$, $-OP(=O)(R)O^-$, or a combination thereof, wherein t is 1 or 2, and R is an aliphatic, aromatic, branched, linear, cyclic, or heterocyclic group, or a combination thereof
p and m are integers of 1 to 10;
q is 0 or 1; and
p+q=3.

Embodiment 26 is the method of any of embodiments 22 through 25 wherein the silicate is an inorganic silicate.

Embodiment 27 is the method of embodiment 26 wherein the silicate is selected from lithium silicate, sodium silicate, potassium silicate, or a combination thereof.

Embodiment 28 is the method of any of embodiments 22 through 27 wherein the non-zwitterionic anionic silane comprises one or more associative functional groups.

Embodiment 29 is the method of embodiment 28 wherein the non-zwitterionic anionic silane comprise a non-zwitterionic sulfonate-functional silane, a non-zwitterionic carboxylate-functional silane, a non-zwitterionic phosphate-functional silane, a non-zwitterionic phosphonic acid-functional silane, a non-zwitterionic phosphonate-functional silane, or a combination thereof.

Embodiment 30 is the method of embodiment 28 or 29 wherein the non-zwitterionic anionic silane has the following formula (Formula I):

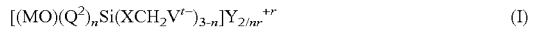

wherein:
each $Q^2$ is independently selected from hydroxyl, alkyl groups containing from 1 to 4 carbon atoms, and alkoxy groups containing from 1 to 4 carbon atoms;

M is selected from hydrogen, alkali metals, and organic cations of strong organic bases having an average molecular weight of less than 150 and a pKa of greater than 11;
X is an organic linking group;
$V^{t-}$ is $-SO_3^-$, $-CO_2^-$, $-OPO_3^{2-}$, $-PO_3^{2-}$, $-OP(=O)(R)O^-$, or a combination thereof, wherein t is 1 or 2, and R is an aliphatic, aromatic, branched, linear, cyclic, or heterocyclic group, or a combination thereof;
Y is selected from hydrogen, alkaline earth metals, organic cations of protonated weak bases having an average molecular weight of less than 200 and a pKa of less than 11, alkali metals, and organic cations of strong organic bases having an average molecular weight of less than 150 and a pKa of greater than 11, provided that M is hydrogen when Y is selected from hydrogen, alkaline earth metals and organic cations of said protonated weak bases;
r is equal to the valence of Y; and
n is 1 or 2.

Embodiment 31 is the method of any of embodiments 22 through 30 wherein the non-zwitterionic anionic silane is present in an amount of 0.0001 wt-% to 10 wt-%, based on the total weight of a ready-to-use composition.

Embodiment 32 is the method of any of embodiments 22 through 31 wherein the metallic surface comprises stainless steel, aluminum, anodized aluminum, titanium, zinc, silver, a surface oxide thereof, or a combination thereof.

Embodiment 33 is an article comprising a metallic surface having the coating composition of any of embodiments 1 through 10 disposed thereon.

Embodiment 34 is an article comprising a metallic surface having a coating disposed thereon, wherein the coating is applied by the method of any of embodiments 11 through 21.

Embodiment 35 is an article comprising a metallic surface having a coating disposed thereon, wherein the coating is applied by the method of embodiment 22 through 32.

Embodiment 36 is an article comprising a metallic surface having a hardened coating disposed thereon; wherein the hardened coating is hydrophilic and comprises: a silicate; and a non-zwitterionic anionic silane; wherein the hardened coating is attached to the surface associatively.

Embodiment 37 is the article of embodiment 36 wherein the metal surface comprises stainless steel, aluminum, anodized aluminum, titanium, zinc, silver, a surface oxide thereof, or a combination thereof.

Embodiment 38 is the article of embodiment 36 or 37 wherein the hardened coating has an advancing water contact angle of less than 30 degrees.

Embodiment 39 is the article of any of embodiments 36 through 38 wherein the hardened coating is less than 100 nm thick.

Embodiment 40 is the article of any of embodiments 36 through 39 wherein the metallic surface forms at least a portion of a refrigerator, dishwasher, stove, oven, microwave, exhaust hood, fryer, grease trap, food-preparation table, cabinet, toilet stall partition, urinal partition, decorative or functional wall cladding in or on an elevator or escalator, wall in a commercial building, decorative or functional panel in an automobile, metal case for an electronic article, piece of manufacturing equipment, or tool.

EXAMPLES

Objects and advantages of various embodiments of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

TOMADOL 91-6 available from Air Products and Chemicals Inc, Allentown, Pa. Phos silane is 3-(Trihydroxysilyl) propyl methylphosphonate, monosodium salt solution 42% in water available from Sigma-Aldrich, St. Louis, Mo.

Sulfonate silane 3-(TRIHYDROXYSILYL)-1-PROPANE-SULFONIC ACID 30-35% in water available from Gelest Inc, Morrisville, Pa.

Carboxylate silane CARBOXYETHYLSILANETRIOL, SODIUM SALT, 25% in water available from Gelest Inc, Morrisville, Pa.

EDTA-type silane is N-(TRIMETHOXYSILYLPROPYL)ETHYLENE-DIAMINE TRIACETIC ACID, TRISODIUM SALT, 45% in water available from Gelest Inc, Morrisville, Pa.

Zwit silane is Preparation of

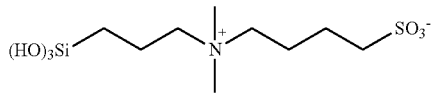

3-(N,N-dimethylaminopropyl)trimethoxysilane (49.7 g, 239 mmol) was added to a screw-top jar followed by deionized (DI) water (82.2 g) and 1,4-butane sultone (32.6 g, 239 mmol). The reaction mixture was heated to 75° C. and mixed for 14 hours.

Vegetable Oil under trade name of Wesson available from ConAgra Foods Omaha, Nebr.

SS grade Multipurpose 304 (0.024-inch thick) with a brush finish (#3) available from McMaster-Carr of Elmhurst, Ill.

Fluke IR heat gun model 62 Max+ Handheld Infrared Dual Laser Thermometer available from Fluke Corporation Everett, Wash.

$Na_2CO_3$ available from J.T. Baker of Center Valley, Pa.

NaOH available from EMD Millipore of Billerica, Mass.

Monoethanol amine available from Ineos Oxide of Houston, Tex.

Benzyl alcohol available from Nexeo Solution of The Woodlands, Tex.

EMERY 658 is a blend of caprylic acid and capric acid available from Emery Oleochemicals of Cincinnati, Ohio.

TERGITOL TMN-3 available from Dow Chemical of Woodland, Mich.

Ultra Fine Test Dust (#12103-1 A1) available from Powder Technology Inc. of Burnsville, Minn.

Diversey Deep Gloss is available from Sealed Air of Sturtevant, Wis.

Ecolab Ecoshine available from Ecolab of St. Paul, Minn.

Sheila Shine available from Sheila Shine Inc, of Miami, Fla.

Preparatory Examples

Preparative Example 1 coating solution was prepared as a 20 wt-% solution of [zwit silane:LSS-75 lithium silicate (50:50 w/w)] with 0.1 wt-% of TOMADOL 91-6 in deionized water [e.g., 20.0 gram of zwit silane (50 wt-% equals 10 gram solid) with 45.5 gram of LSS-75 lithium silicate (22 wt-% equals 10 gram solid) [(50:50 w/w)], plus 0.1 gram (g) of TOMADOL 91-6, plus 34.4 total grams of deionized water (total water in solution equals 79.9 gram).

Preparative Example 2 coating solution was prepared as a 20 wt-% solution of [zwit silane:LSS-75 lithium silicate (30:70 weight/weight (w/w))] with 0.1 wt-% of TOMADOL 91-6 in deionized water.

Preparative Example 3 coating solution was prepared as a 20 wt-% solution of [zwit silane:LSS-75 lithium silicate (70:30 w/w)] with 0.1 wt-% of TOMADOL 91-6 in deionized water.

Preparative Example 4 coating solution was prepared as a 20 wt-% solution of [EDTA-type silane:LSS-75 lithium silicate (70:30 w/w)] with 0.1 wt-% of TOMADOL 91-6 in deionized water. Preparative Example 5 coating solution was prepared as a 20 wt-% solution of [carboxy silane:LSS-75 lithium silicate (70:30 w/w)] with 0.1 wt-% of TOMADOL 91-6 in deionized water.

Preparative Example 6 coating solution was prepared as a 20 wt-% solution of [phos silane:LSS-75 lithium silicate (70:30 w/w)] with 0.1 wt-% of TOMADOL 91-6 in deionized water.

Preparative Example 7 coating solution was prepared as a 20 wt-% solution of [sulfonate silane:LSS-75 lithium silicate (70:30 w/w)] with 0.1 wt-% of TOMADOL 91-6 in deionized water.

Preparative Example 8 coating solution was prepared as a 2 wt-% solution of [zwit silane:LSS-75 lithium silicate: carboxy silane (35:30:35 w/w)] with 0.1 wt-% of TOMADOL 91-6 in deionized water.

Preparative Example 9 coating solution was prepared as a 2 wt-% solution of [zwit silane:LSS-75 lithium silicate:phos silane (35:30:35 w/w)] with 0.1 wt-% of TOMADOL 91-6 in deionized water.

Preparative Example 10 coating solution was prepared as a 2 wt-% solution of [zwit silane:LSS-75 lithium silicate: EDTA-type silane (35:30:35 w/w)] with 0.1 wt-% of TOMADOL 91-6 in deionized water.

Preparative Example 11 coating solution was prepared as a 2 wt-% solution of [zwit silane:LSS-75 lithium silicate: sulfonate silane (20:10:70 w/w)] with 0.1 wt-% of TOMADOL 91-6 in deionized water.

Preparative Example 12 solution contained 2 wt-% of [zwit silane:LSS-75 lithium silicate:phos silane (35:30:35 w/w)], 2 wt-% of $Na_2CO_3$/NaOH (80:20 w/w), with 0.1 wt-% of TOMADOL 91-6 in deionized water.

Preparative Example 13 solution contained 2 wt-% of [zwit silane:LSS-75 lithium silicate:phos silane (35:30:35 w/w)], 12.8 wt-% of [monoethanol amine:benzyl alcohol: Emery 658 (36.7:37.5:25.8 w/w)] and 0.4 wt-% of TERGITOL TMN-3 in deionized water.

Preparative Example 14 coating solution contained 2 wt-% of [zwit silane:LSS-75 lithium silicate:phos silane (35:30:35 w/w)], 2 wt-% of NaOH, and 0.1 wt-% of TOMADOL 91-6 in deionized water.

Preparative Example 15 coating solution was prepared as a 0.1 wt-% of TOMADOL 91-6 in deionized water.

Preparative Example 16 solution contained 3 wt-% of $Na_2CO_3$/NaOH (80:20 w/w), and 0.1 wt-% of TOMADOL 91-6 in water.

Preparative Example 17 solution contained 12.8 wt-% of [monoethanol amine:benzyl alcohol:Emery 658 (36.7:37.5: 25.8 w/w)] and 0.4 wt-% of TERGITOL TMN-3 in deionized water.

Preparative Example 18 coating solution contained 2 wt-% of NaOH, and 0.1 wt-% of TOMADOL 91-6 in water.

Examples 1-3

Visual Appearance of Zwitterionic Silane/Optional Hydrophilic Silane/Lithium Silicate Coatings on As-Received Stainless Steel For Examples 1-3 stainless steel panels 5.1 centimeter (cm) by 7.6 cm were cleaned with Preparative Examples 1-3 (about 0.1 milliliter per square centimeter (mL/cm$^2$) solution used) using a folded KIMBERLY-CLARK KIMWIPE towel (obtained from Kimberly Clark of Roswell, Ga.) for a total of 15 seconds. After the panels had dried at room temperature for a period up to 5 minutes, the process of cleaning and drying with Preparative Examples 1-3 was repeated a total of 50 cleaning cycles. The samples were visually inspected after the cycles were complete, and comments on appearance recorded.

TABLE 1

Components: zwit silane + silicate + surfactant

| Example | Solution | Solution Details | Observation |
|---|---|---|---|
| 1 | PE 1 | 20 wt % 50/50 zwit/LiSil + surfactant | extensive white streaks evident throughout coating |
| 2 | PE 2 | 2 wt % 30/70 zwit/LiSil + surfactant | chalky/flaky white spots throughout coating |
| 3 | PE 3 | 2 wt % 70/30 zwit/LiSil + surfactant | shiny uniform appearance |

The data presented in Table 1 illustrates the preference to have less than 50% lithium silicate in our compositions.

Examples 3-7, and Comparative A

For Examples 3-7, and Comparative A stainless steel panels 5.1 cm by 7.6 cm were cleaned with Preparative Examples 3-7, and 15 (9 drops of solution from a 2 mL disposable pipette), using a folded KIMBERLY-CLARK KIMWIPE towel (obtained from Kimberly Clark of Roswell, Ga.) for a total of 15 seconds (s). After the panels had dried at room temperature for 5 minutes the process of cleaning and drying with Preparative Examples 3-7, and 15 was repeated a total of 5 cleaning cycles. The samples remained at room temperature for 12 hours (h) before subjecting them to the Fingerprint Test, and Vegetable Oil Removal Test.

Fingerprint Removal Test:

The samples from Examples 3-7 and Comparative Example A were tested for their cleanability (of fingerprints) as well as the longevity of the coatings when subjected to repeat soiling tests. For the test, a facial oil fingerprint was applied to the coated surfaces of samples from examples 3-7 and comparative example A. Using facial oil a fingerprint was placed on each sample with approximately (~) 250 grams (g) of force, the samples were allowed to stand for a period of time less than 5 minutes at room temperature. The samples were subsequently subjected to Preparative Example 15 (1 mL) applied via pipette over a period of 30 seconds before drying the samples with compressed air. The samples were visually inspected and scored on a scale of 1=good to 5=bad. If the oil was not removed (samples scored >3) no further testing was done for that sample. If the oil was removed successfully, samples were resubjected to the test until the samples failed. For Example 7, the sample failed after 3 cycles.

Vegetable Oil Removal Test:

The samples from Examples 3-7 and Comparative Example A were tested for their cleanability (of vegetable) as well as the longevity of the coatings when subjected to repeated soiling tests. For the test, a drop of vegetable oil was applied to the coated surfaces of samples from Examples 3-7 and Comparative Example A, the samples were allowed to stand for a period of time less than 5 minutes at room temperature. The samples were subsequently subjected to Preparative Example 15 (1 mL) applied via pipette over a period of 30 seconds before drying the samples with compressed air. The samples were visually inspected and scored on a scale of 1=good to 5=bad. If the oil was not removed (samples scored>3) no further testing was done for that sample. If the oil was removed successfully, samples were resubjected to the test until the samples failed. For Example 7, the samples failed after 3 cycles.

TABLE 2

Components: silane + silicate + surfactant

| Example | Solution | Solution Details | # Oil Cycles | #Fingerprint Cycles |
|---|---|---|---|---|
| Comparative Example 1 | PE 15 | 0.1% Tomadol surfactant | <1 | <1 |
| 3 | PE 3 | 2 wt % 70/30 zwit/LiSi + surfactant 1 | 1 | <1 |
| 4 | PE 4 | 2 wt % 70/30 EDTA-type/LiSi + surfactant | >5 | >5 |
| 5 | PE 5 | 2 wt % 70/30 Carboxy/LiSi + surfactant | >5 | >5 |
| 6 | PE 6 | 2 wt % 70/30 phos/LiSi + surfactant | >5 | >5 |
| 7 | PE 7 | 2% 80/20 sulfonate/silicate + surfactant | 3 | 3 |

The data in Table 2 highlights hydrophilic silanes with ionizable functional (demonstrated phosphonate, carboxylate, sulfonate, and more than one carboxylate group per silane) groups in combination with silicate can provide protection/easy clean in one step.

Examples 3, 8-11

For Examples 3 and 8-11 stainless steel panels 5.1 cm by 7.6 cm were cleaned with Preparative Examples 3 and 8-11 (9 drops of solution from a 2 mL disposable pipette), using a folded KIMBERLY-CLARK KIMWIPE towel (obtained from Kimberly Clark of Roswell, Ga.) for a total of 15 seconds. After the panels had dried at room temperature for 5 minutes the process of cleaning and drying with Preparative Examples 3 and 8-11 was repeated a total of 5 cleaning cycles. The samples remained at room temperature for 12 hours before subjecting them to the Fingerprint Test, and Vegetable Oil Removal Test.

TABLE 3

Components: silane + silicate + zwitterionic + surfactant

| Number | Solution | Solution Details | # Oil Cycles | #Fingerprint Cycles |
|---|---|---|---|---|
| 3 | PE 3 | 2 wt % 70/30 zwit/LiSil + surfactant | 1 | <1 |

TABLE 3-continued

Components: silane + silicate + zwitterionic + surfactant

| Number | Solution | Solution Details | # Oil Cycles | #Fingerprint Cycles |
|---|---|---|---|---|
| 8 | PE 8 | 2 wt % 35:30:35 zwit/LiSil/ carboxy + surfactant | >5 | >5 |
| 9 | PE 9 | 2 wt % 35:30:35 zwit/LiSil/ phos + surfactant | >5 | >5 |
| 10 | PE 10 | 2 wt % 35:30:35 zwit/LiSil/ EDTA + surfactant | >5 | >5 |
| 11 | PE 11 | 2 wt % 20:10:70 zwit/LiSil/ sulfonate + surfactant | 4 | 4 |

The data in Table 3 highlights hydrophilic silanes with ability to bind to stainless steel (SS) in combination with silicate and zwitterionic functionality provide protection/ easy clean in one step.

Examples 12-14, and Comparative B-D (Initial Performance Testing)

For Examples 12-14, and Comparative B-D stainless steel panels 5.1 cm by 7.6 cm were cleaned with Preparative Examples 12-14 and 16-18 (9 drops of solution from a 2 mL disposable pipette), using a folded KIMBERLY-CLARK KIMWIPE towel (obtained from Kimberly Clark of Roswell, Ga.) for a total of 15 seconds. After the panels had dried at room temperature for 5 minutes the process of cleaning and drying with Preparative Examples 12-14 and 16-18 was repeated a total of 10 cleaning cycles. The samples remained at room temperature for 12 hours before subjecting them to the Fingerprint Test, Vegetable Oil Removal Test, Room Temp Oil Film Cleaning Test, and Heated Oil Film Cleaning Test.

Coated Oil Panels:

Coated stainless steel panels 5.1 cm by 7.6 cm were prepared by removing the protective liner from the panel. Vegetable oil was applied to the liner side of the panels using a 5.1 cm wide bristle paint brush. The oil residue left on the panels was about 0.5 grams of oil. The oiled panels were placed on a large glass sheet before being placed in a bath oven at 205 C for 50 minutes. After the panels were removed from the oven they remained at room temperature for at least 24 hours prior to use. It should be noted that the oil was solidified after removal from the oven. In the event the oil was not solidified on a portion of the panel it was discarded.

Room Temp Oil Film Cleaning Test:

The samples from Examples 12-14 and Comparative Example B-D were tested for their ability to cut though baked on oil. For the test, 3 drops of Preparative Examples 12-14 and 16-18 were applied to the oil surface using a 2 mL pipette. After a period of 1 minute the solution was rinsed off under tap water for 5 seconds, and dried with compressed air before being rated (1=Complete removal, 2=partial removal, 3=strong discoloration of oil, but no removal, 4=discoloration of oil, but no removal, 5=very faint to no discoloration, and no removal).

Heated Oil Film Cleaning Test:

The samples from Examples 12-14 and Comparative Example B-D were tested for their ability to cut though baked on oil while at elevated temperatures. For the test, a coated oil panel was allowed to warm on a hot plate for a period of 3-5 minutes at 115° C. The coated oil panel surface temperature was about 80° C. as measured with a Fluke IR heat gun prior to the application of the solutions. To the heated pane 3 drops of Preparative Examples Preparative Examples 12-14 and 16-18 were applied using a 2 mL pipette. After a period of 1 minute the solution was rinsed off under tap water for 5 seconds, and dried with compressed air before being rated (1=Complete removal, 2=partial removal, 3=strong discoloration of oil, but no removal, 4=discoloration of oil, but no removal, 5=very faint to no discoloration, and no removal).

TABLE 4

Components: zwit silane + silicate + surfactant in cleaning formulations

| Number | Solution | Solution Details | # Oil Cycles | #F.P. Cycles | Heated Drop | RT Drop |
|---|---|---|---|---|---|---|
| Comparative Example B | PE 16 | +surfactant + 3% (80:20) Na2CO3/NaOH | 1 | <1 | 1 | 3.5 |
| Comparative Example C | PE 17 | +surfactant + monoethanol amine + benzyl alcohol + | <1 | <1 | 2 | 5 |
| Comparative Example D | PE 18 | +surfactant + 2% NaOH | <1 | <1 | 1 | 3 |
| 12 | PE 12 | 2 wt % 35:30:35 zwit/LiSi/Phos + surfactant + 2% (80:20) Na2CO3/NaOH | >5 | >5 | 2 | 4 |
| 13 | PE 13 | 2 wt % 35:30:35 zwit/LiSi/Phos + surfactant + monoethanol amine + benzyl alcohol+ | 2 | >5 | 2.5 | 5 |
| 14 | PE 14 | 2 wt % 35:30:35 zwit/LiSi/Phos + surfactant + 2% NaOH | >5 | >5 | 1 | 3 |

The data in Table 4 illustrates that compositions can protect surface and cut through baked-on oil. Compositions include additional base (organic and inorganic) and solvent. Heated drop was the cleaning solution applied to the surface of hot baked-on oil. RT Drop was the same test method, but at room temperature (RT).

Example 15 and Comparative Examples E-H

For Example 15 stainless steel panels 5.1 cm by 7.6 cm were cleaned with Preparative Examples 9, (9 drops of solution from a 2 mL disposable pipette), using a folded KIMBERLY-CLARK KIMWIPE towel (obtained from Kimberly Clark of Roswell, Ga.) for a total of 15 seconds. After the panels had dried at room temperature for 5 minutes the process of cleaning and drying with Preparative Example 9 was repeated a total of 5 cleaning cycles before subjecting sample to the dry dirt tumble test.

For Comparative Example E stainless steel panels 5.1 cm by 7.6 cm were used as is after the liner was removed from the panel before subjecting sample to the dry dirt tumble test.

For Comparative Examples F-H stainless steel panels 5.1 cm by 7.6 cm were polished with commercially available materials, (4 drops of solution from a 2 mL disposable pipette), using a folded KIMBERLY-CLARK KIMWIPE towel (obtained from Kimberly Clark of Roswell, Ga.) before subjecting sample to the dry dirt tumble test.

Dry Dirt Tumble Test:

The samples from Examples 15 and Comparative Example E-H were tested for their ability to resist dry dirt accumulation. For the test, a sample was placed in a 32 ounce jar with a screw top lid. The jar 5 grams of 12103-1 A1 Ultra Fine Test Dust was added to the jar. The jar was shaken for a total of 15 seconds before the sample was removed, and the gloss was measured. The gloss was measured with a BYK Gardner Micro-tri-gloss instrument. The gloss meter was placed such that the incidental beam angle was orthogonal to the brushed pattern on the stainless steel.

| Number | Solution | Solution Details | Initial Gloss (60 Degree) | Gloss After Soil Test (60 Degree) |
|---|---|---|---|---|
| Comp. Ex. E | N/A | Bare SS | 61.4 | 24.9 |
| Comp. Ex. F | N/A | Diversey Deep Gloss | N/A | 3.2 |
| Comp. Ex. G | N/A | Sheila Shine | N/A | 2.0 |
| Comp. Ex. H | N/A | Ecolab | N/A | 1.1 |
| 15 | PE 9 | 2 wt % 35:30:35 zwit/LiSil/ phos + surfactant | N/A | 35.6 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of protecting a metallic surface, the method comprising:
   providing a coating composition comprising:
     greater than 0 wt-% and up to 50 wt-% of a silicate;
     a non-zwitterionic anionic silane; and
     water;
     wherein the weight percent of silicate is based on the total weight of silicate(s) plus silane(s) solids in the composition, whether the composition is a ready-to-use composition or a concentrated composition;
   optionally, diluting the coating composition, if concentrated, to a ready-to-use composition;
   applying the ready-to-use composition to a metallic surface; and
   allowing the ready-to-use composition to dry on the metallic surface.

2. The method of claim 1 wherein the coating composition further comprises a zwitterionic silane, and where the zwitterionic silane comprises a zwitterionic sulfonate-functional silane, a zwitterionic carboxylate-functional silane, a zwitterionic phosphate-functional silane, a zwitterionic phosphonic acid-functional silane, a zwitterionic phosphonate-functional silane, or a combination thereof.

3. The method of claim 2 wherein the zwitterionic silane has the following formula (Formula II):

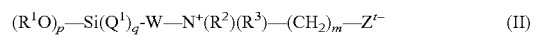

(II)

wherein:
   each $R^1$ is independently a hydrogen, methyl group, or ethyl group;
   each $Q^1$ is independently selected from hydroxyl, alkyl groups containing from 1 to 4 carbon atoms, and alkoxy groups containing from 1 to 4 carbon atoms;
   each $R^2$ and $R^3$ is independently a saturated or unsaturated, straight chain, branched, or cyclic organic group, which may be joined together, optionally with atoms of the group W, to form a ring;
   W is an organic linking group;
   $Z^{t-}$ is $-SO_3^-$, $-CO_2^-$, $-OPO_3^{2-}$, $-PO_3^{2-}$, $-OP(=O)(R)O^-$, or a combination thereof, wherein t is 1 or 2, and R is an aliphatic, aromatic, branched, linear, cyclic, or heterocyclic group, or a combination thereof;
   p and m are integers of 1 to 10;
   q is 0 or 1; and
   p+q=3.

4. The method of claim 3 wherein the silicate is an inorganic silicate selected from lithium silicate, sodium silicate, potassium silicate, or a combination thereof.

5. The method of claim 1 wherein the non-zwitterionic anionic silane comprises one or more associative functional groups.

6. The method of claim 5 wherein the non-zwitterionic anionic silane comprise a non-zwitterionic sulfonate-functional silane, a non-zwitterionic carboxylate-functional silane, a non-zwitterionic phosphate-functional silane, a non-zwitterionic phosphonic acid-functional silane, a non-zwitterionic phosphonate-functional silane, or a combination thereof.

7. The method of claim 6 wherein the non-zwitterionic anionic silane has the following formula (Formula I):

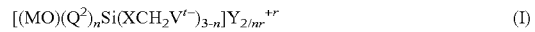

(I)

wherein:
- each $Q^2$ is independently selected from hydroxyl, alkyl groups containing from 1 to 4 carbon atoms, and alkoxy groups containing from 1 to 4 carbon atoms;
- M is selected from hydrogen, alkali metals, and organic cations of strong organic bases having an average molecular weight of less than 150 and a pKa of greater than 11;
- X is an organic linking group;
- $V^{r-}$ is $-SO_3^-$, $-CO_2^-$, $-OPO_3^{2-}$, $-PO_3^{2-}$, $-OP(=O)(R)O^{31}$, or a combination thereof, wherein t is 1 or 2, and R is an aliphatic, aromatic, branched, linear, cyclic, or heterocyclic group, or a combination thereof;
- Y is selected from hydrogen, alkaline earth metals, organic cations of protonated weak bases having an average molecular weight of less than 200 and a pKa of less than 11, alkali metals, and organic cations of strong organic bases having an average molecular weight of less than 150 and a pKa of greater than 11, provided that M is hydrogen when Y is selected from hydrogen, alkaline earth metals and organic cations of said protonated weak bases;
- r is equal to the valence of Y; and
- n is 1 or 2.

8. The method of claim 1 wherein the metallic surface comprises stainless steel, aluminum, anodized aluminum, titanium, zinc, silver, a surface oxide thereof, or a combination thereof.

9. The method of claim 1 further comprising applying the ready-to-use composition to the metallic surface under conditions effective to remove contaminants from the metallic surface; and allowing the ready-to-use composition to dry on the metallic surface.

10. An article comprising a metallic surface having a hardened coating disposed thereon; wherein the hardened coating is hydrophilic and comprises:
- a silicate; and
- a non-zwitterionic anionic silane;
- wherein the hardened coating is attached to the surface associatively.

11. The article of claim 10 wherein the metal surface comprises stainless steel, aluminum, anodized aluminum, titanium, zinc, silver, a surface oxide thereof, or a combination thereof.

12. The article of claim 10 wherein the hardened coating is less than 100 nm thick.

13. The article of claim 10 wherein the metallic surface forms at least a portion of a refrigerator, dishwasher, stove, oven, microwave, exhaust hood, fryer, grease trap, food-preparation table, cabinet, toilet stall partition, urinal partition, decorative or functional wall cladding in or on an elevator or escalator, wall in a commercial building, decorative or functional panel in an automobile, metal case for an electronic article, piece of manufacturing equipment, or tool.

14. The method of claim 1 wherein the metallic surface comprises stainless steel, a surface oxide thereof, or a combination thereof.

15. The method of claim 1 wherein the metallic surface comprises aluminum, anodized aluminum, a surface oxide thereof, or a combination thereof.

16. The article of claim 10 wherein the metallic surface comprises stainless steel, a surface oxide thereof, or a combination thereof.

17. The article of claim 10 wherein the metallic surface comprises aluminum, anodized aluminum, a surface oxide thereof, or a combination thereof.

* * * * *